UNITED STATES PATENT OFFICE.

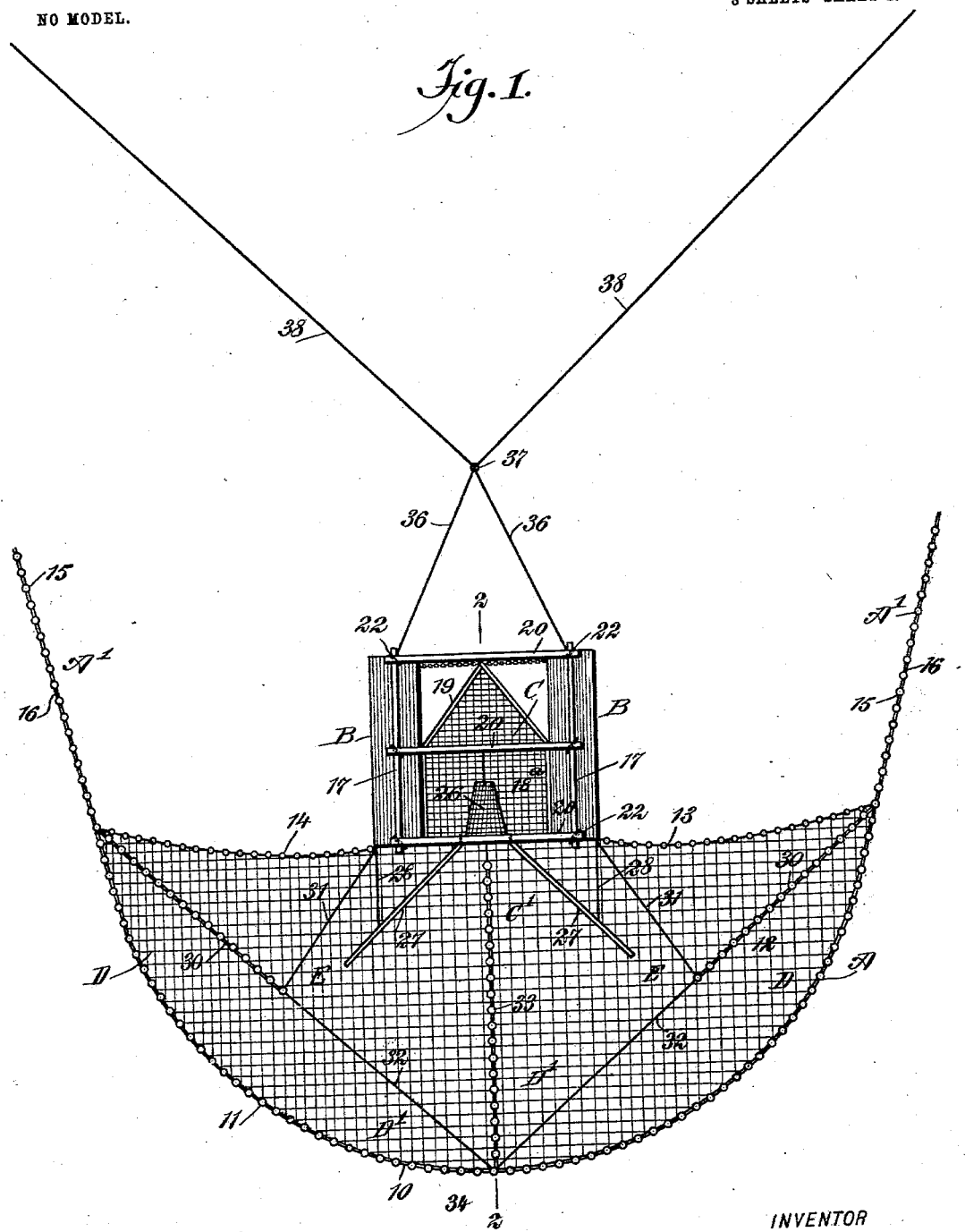

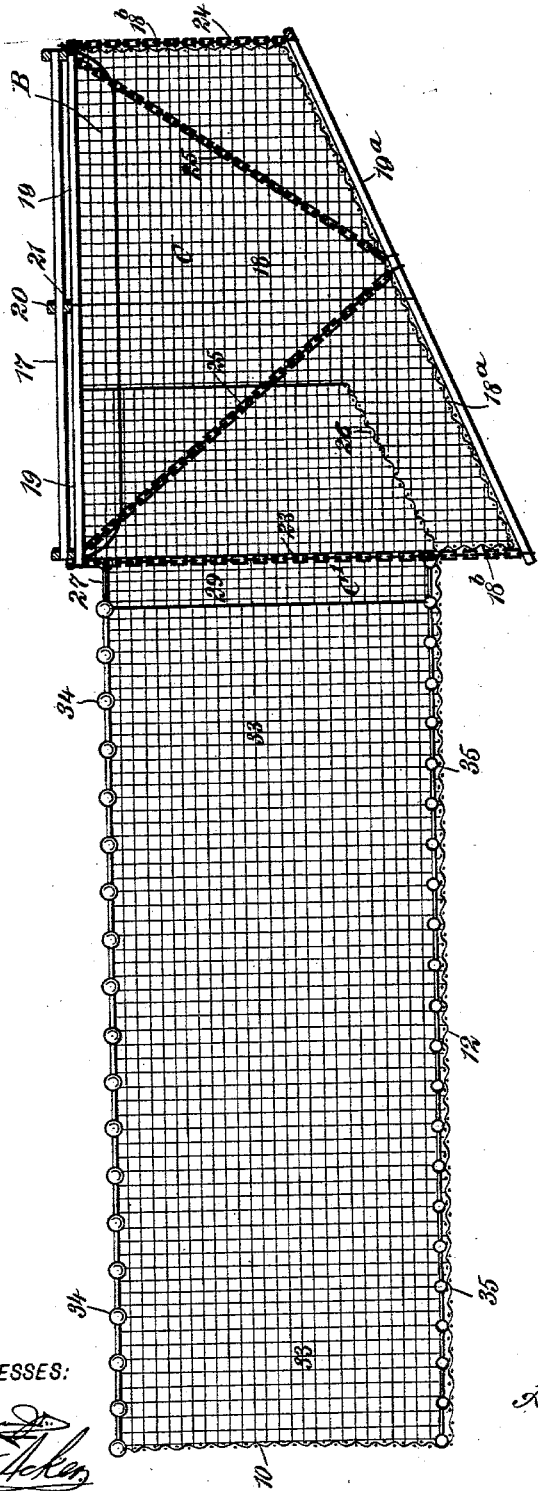

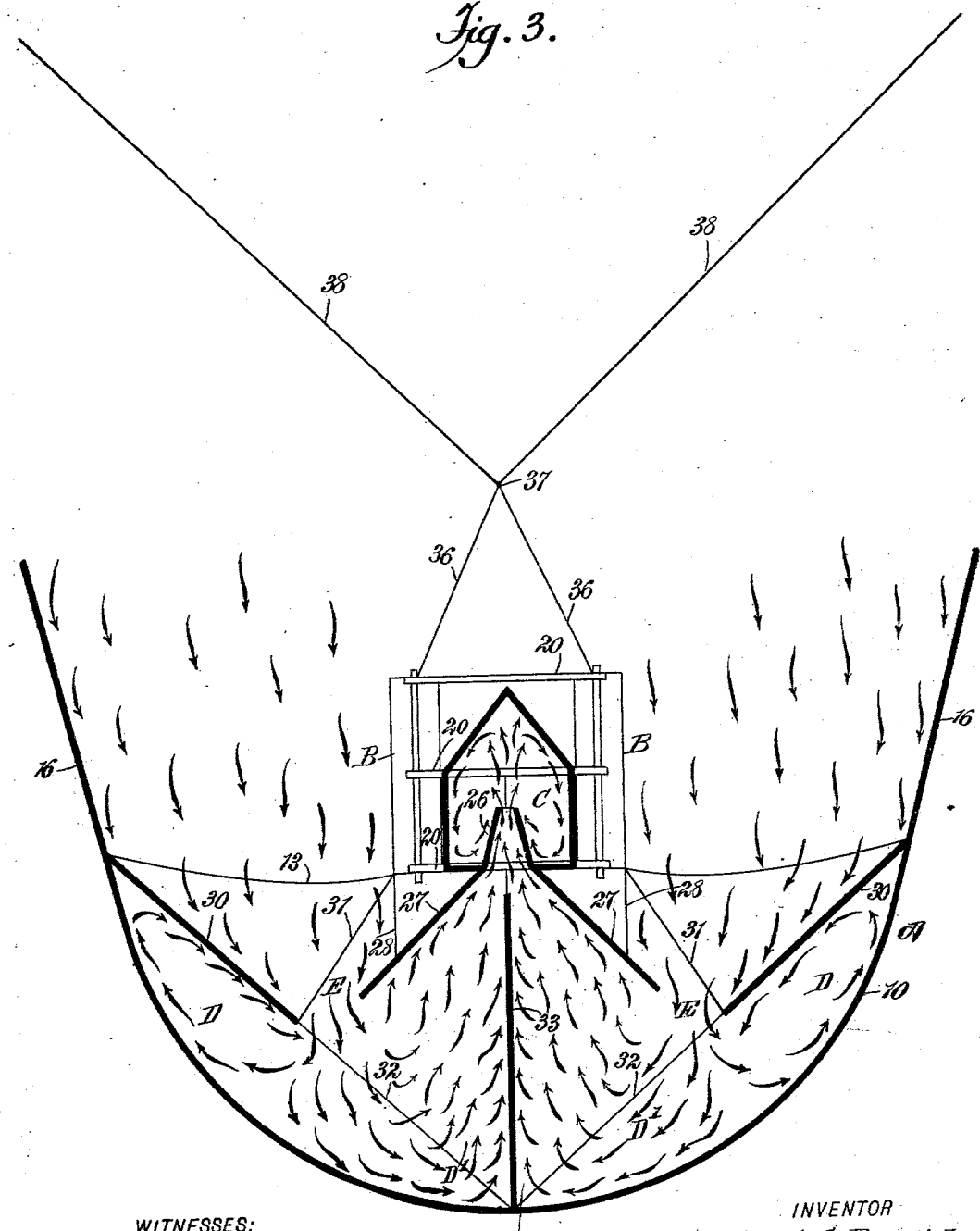

ALBERT CROMWELL BURDICK, OF SEATTLE, WASHINGTON.

FLOATING FISH-TRAP.

SPECIFICATION forming part of Letters Patent No. 717,807, dated January 6, 1903.

Application filed June 26, 1902. Serial No. 113,232. (No model.)

*To all whom it may concern:*

Be it known that I, ALBERT CROMWELL BURDICK, a citizen of the United States, and a resident of Seattle, in the county of King and State of Washington, have invented a new and Improved Floating Fish-Trap, of which the following is a full, clear, and exact description.

The purpose of my invention is to provide a floating fish-trap adapted particularly to be towed or drawn by steamers or like vessels, and to so construct the trap that a single heart only is used in connection with the pot, which heart extends over the seine, and to yieldingly support the pot upon scows or like floats in such manner that the rocking of the scows by the action of the waves will not have any detrimental influence upon the proper equilibrium of the pot, and to provide means whereby independent inlets are obtained over the seine, one at each side of the heart, and a pocket in connection with each inlet, which pockets and inlets all serve to direct the fish through the heart and into the pot.

Another important feature of the invention consists in inclining the bottom of the pot and its supports from the rear upwardly and forwardly, so that the pot and its supports will ride the current and waves and will not tow under.

The invention consists in the novel construction and combination of the several parts, as will be hereinafter fully described, and pointed out in the claims.

Reference is to be had to the accompanying drawings, forming a part of this specification, in which similar characters of reference indicate corresponding parts in all the figures.

Figure 1 is a plan view of the improved trap. Fig. 2 is a central vertical section taken practically on the line 2 2 of Fig. 1, and Fig. 3 is a diagrammatic plan view of the trap.

The seine A is segmental in formation and consists of a vertical marginal wall 10, made of netting, as usual, which wall is provided with floats 11 at the top and with suitable weights at the bottom. The forward portion of the seine A is open, and the said seine is provided with a bottom section 12, connected with the marginal wall 10, and at the forward edge 13 of the bottom 12 suitable weights 14 are secured. Leads 16 are attached to the forward end portions of the seine A, extending forwardly therefrom in opposite directions, and these leads are likewise constructed of vertical sections 16, of suitable netting, having floats 15 at their upper edges and suitable weights at their lower edges. Two scows B are located at the front central portion of the seine, which scows are parallel and have a suitable space between them. In said space between the scows the pot C is located, to be hereinafter described. The seine extends down any desired distance below the scows and is connected therewith and supported therefrom by chains, ropes, or their equivalents, suitably applied. Each scow B is provided at the central portion of its deck with a longitudinal beam 17, supported a suitable distance above the deck, as is shown in Figs. 1 and 2. These beams 17 extend, preferably, from end to end of the scows.

The pot C, heretofore referred to, is pointed at its forward portion and is rectangular at its rear portion. The said pot consists of sides 18, a bottom 18$^a$, and front and rear walls 18$^b$, made of netting of suitable mesh, and the parts 18 and 18$^b$ are connected at their upper edges to a horizontal frame 19, of stout material, the said frame being pointed at the front and rectangular at the back, as is shown in Fig. 1. The frame 19 is attached to lower cross-bars 21, which in conjunction with upper cross-bars 20 pass from scow to scow in engagement with the longitudinal bars or beams 17 of the scows, being flexibly connected to the said longitudinal beams 17 by chains 22 or their equivalents, so that there is a yielding connection between the pot and the scows, enabling the scows to have movement one up and the other down without materially interfering with the action of the pot C. In order that the said pot shall not tow under, but will ride the waves and current readily, the bottom 18$^a$ is given an upward and forward inclination from its back portion, as is shown in Fig. 2, and the rear portion of the pot preferably extends below the bottom of the seine, as is also shown in Fig. 2. In order that the pot shall remain in a vertical position in the water, a frame 19$^a$, of heavy material, such as iron, is located at the bottom of the pot, the frame 19$^a$ being of the same shape as the upper frame 19; but while the upper frame 19 is horizontal the lower and weighty frame 19ª has an upward and forward inclination, like that imparted to the bottom of the pot, as is also shown in Fig. 2. This bottom frame is supported by rear and front chains 23 and 24, attached to corresponding portions of the frame 19ª and to the scows B, and by diagonal or cross chains 25, which are connected with the frame 19ª at the central portion of its side members and extend in opposite directions to the end portions of the scows, as is also shown in Fig. 2. A tunnel 26 is used in connection with the pot, leading from the rear to its interior, and a vertical opening is provided in the rear portion of the pot, the wall of which opening receives the outer edges of the said tunnel, as is best shown in Fig. 2. The bottom of the tunnel 26 is also given an upward and forward inclination in order that it may not be affected by the action of the water as the trap is towed. Booms 27 extend from the rear of the pot, one at each side of the opening therein leading into the tunnel. These booms extend rearwardly and outwardly in opposite directions over the seine A, as is best shown in Figs. 1 and 3. Walls 29 of netting extend downward from these booms and are attached to the bottom 12 of the seine. The booms are held in their spread position by means of ropes 28, attached thereto and to the scows.

Vertical partitions 30, of netting, extend from the forward corners of the seine diagonally rearward across the bottom of the seine and are attached to said bottom, the upper portions of said partitions 30 being provided with suitable floats. The said partitions extend rearwardly in direction of the booms and stop practically opposite the booms, yet removed therefrom, so as to provide an entrance E to the heart C', formed by the booms 27 and the netting carried thereby. The partitions 30 are held in their diagonal positions by means of ropes 31, attached to their inner ends and to the rear end portions of the scows, and through additional ropes 32, also attached to the inner ends of the partitions 30 and to the rear wall of seine at its central portion, as is shown in Figs. 1 and 3. A transverse central vertical partition 33, constructed of netting, extends from the central portion of the rear or marginal wall of the seine A into the heart C', across the heart at its central portion, and the said central partition 33 terminates at a point removed as far as may be desired from the entrance to the tunnel 26. The said central partition 33 is provided at its upper end with floats 34 and at its lower portion with suitable weights 35, as is shown in Fig. 2. This central partition may or may not be attached to the bottom 12 of the seine A. The diagonal partitions 30 form side pockets D, and the spaces at the rear of the heart C' and at each side of the central partition 33 constitute rear chambers D' in direct communication with the heart and also in direct communication with the side pockets D.

Ropes or chains 26 are secured to the forward end portions of the scows B, and these ropes or chains 36 are connected at their forward ends by a ring 37 or its equivalent. Other ropes or chains 38 are likewise connected with the ring 37 and extend forwardly and outwardly in opposite directions to a connection with the forward ends of the leads A'. The forward ends of said leads are attached in any suitable or approved manner to the tug, steamer, or other character of vessel adapted to tow the trap through the water.

In operation, the fish entering the space between the leads A' will be directed to the openings or entrances E over the seine A, and the fish will then swim along the central partition 33 into the heart C' and from thence into the tunnel 26 and will finally find their way out into the pot C. But some of the fish may buck the tide and swim around in the side pockets D; but as they meet the diagonal partitions 30 they will turn about and follow the said partitions to their inner ends, and thus will be guided to the heart and will eventually find their way through the tunnel and into the pot.

Having thus described my invention, I claim as new and desire to secure by Letters Patent—

1. A floating fish-trap provided with a pot having its bottom upwardly and forwardly inclined from its rear end, for the purpose described.

2. In a floating fish-trap, a pot having its bottom upwardly and rearwardly inclined from its rear in direction of its forward end, floats supporting the said pot, and a weighty frame engaged with the bottom of the pot and correspondingly inclined, and flexible connections between the floats and the said weighty frame, for the purpose set forth.

3. In a floating fish-trap, parallel floats, a yielding connection between the floats, and a pot located between the floats, the said pot being provided with a bottom inclined upwardly and forwardly from its rear portion, and a frame yieldingly suspended from the floats, engaging with the bottom of the pot, the said frame having the same inclination as the bottom of the said pot, as and for the purpose specified.

4. In a floating fish-trap, parallel floats, a yielding connection between the floats, and a pot located between the floats, the said pot being provided with a bottom inclined upwardly and forwardly from its rear portion, a frame yieldingly suspended from the floats, engaging with the bottom of the pot, the said frame having the same inclination as the bottom of the said pot, a seine located at the rear of the pot and floats, leads from the said seine, a single heart extending over the seine from the pot, and a tunnel establishing communication between the said heart and the said pot.

5. In a floating fish-trap, a float, a weighty frame flexibly supported by said float, said frame having an upward and forward inclination, and a pot the bottom of which is correspondingly inclined to the said frame and engages with the frame, the said pot having a pointed forward section and a rectangular rear section, and means, substantially as described, for supporting the pot, as and for the purpose specified.

6. In a floating fish-trap, the combination with a float-sustained pot, a seine also float-sustained and located at the rear of the pot, and a tunnel extending from the rear of the pot forwardly therein, of a heart located over the seine at the rear of the pot, consisting of booms extending in opposite directions over the seine from the sides of the tunnel and net walls extending from the booms to the bottom of the seine, a central transverse vertical partition constructed of netting, extending from the rear of the frame centrally within the said heart and diagonal partitions vertically located over the seine, extending rearwardly from the forward corners thereof, whereby side and rear pockets are formed in the seine at the rear of the said heart and at each side of the central transverse partition, and entrance-passages are formed between the said diagonal partitions and the inner ends of the side portions of the heart, for the purpose described.

7. The combination with a seine, of a floating fish-trap at the front end thereof provided with a pot having its bottom upwardly and forwardly inclined from its rear end, said rear end extending below the bottom of the seine, as specified.

In testimony whereof I have signed my name to this specification in the presence of two subscribing witnesses.

ALBERT CROMWELL BURDICK.

Witnesses:
K. H. HATFIELD,
L. P. MANNING.